United States Patent [19]
Rahtican

[11] Patent Number: 5,107,666
[45] Date of Patent: Apr. 28, 1992

[54] LAWN SCOOP

[76] Inventor: Gregory Rahtican, 912 Danton La., Alexandria, Va. 22308

[21] Appl. No.: 475,311

[22] Filed: Feb. 5, 1990

[51] Int. Cl.[5] ........................................... A01D 11/00
[52] U.S. Cl. ...................................... 56/202; 248/101
[58] Field of Search .................. 56/202, 203, 206, 1, 56/194, 327.1, DIG. 9; 232/43.1; 248/101, 99, 95

[56] References Cited

U.S. PATENT DOCUMENTS

| | | | |
|---|---|---|---|
| 1,125,286 | 1/1915 | Flinchbaugh | 248/101 |
| 2,086,416 | 7/1937 | Howard | 248/101 |
| 2,636,656 | 4/1953 | Tanabe | 248/101 |
| 3,936,087 | 2/1976 | Alexander | 248/99 |
| 3,942,832 | 3/1976 | Haas, Jr. | 248/101 |
| 4,069,994 | 1/1978 | Wharmby | 248/101 |
| 4,159,139 | 6/1979 | Gawedzinski | 248/101 |
| 4,312,531 | 1/1982 | Cross | 248/99 |
| 4,470,627 | 9/1984 | Carroll et al. | 248/101 |
| 4,832,291 | 5/1989 | Nelson et al. | 248/99 |
| 4,832,292 | 5/1989 | Beckham | 248/99 |

FOREIGN PATENT DOCUMENTS 35307 5/1966 Finland ................................ 248/101

Primary Examiner—Terry Lee Melius
Attorney, Agent, or Firm—Nixon & Vanderhye

[57] ABSTRACT

A scoop allows one to readily collect leaves and like lawn debris from a grassy area. The scoop has a tubular end with handles extending from either side of the tubular end. A plastic bag is releasably connected to the tubular end as by laying the open mouth of the bag over a groove, with a rubber gasket, on the exterior surface of the tubular end, and clamping the open mouth of the bag into place. The handles of the scoop are grasped by the user, and the scoop is moved into the pile of leaves and like debris to force the debris through the tubular portion of the scoop in the plastic bag. Once the plastic bag is filled it is disconnected from the tubular end by unclamping the clamp, and replaced with another bag. The entire scoop, with the exception of the clamp (which may be a campaniform ring), is an integral piece of ABS plastic.

19 Claims, 2 Drawing Sheets

LAWN SCOOP

BACKGROUND AND SUMMARY OF THE INVENTION

Many homeowners and landscaping services dispose of fallen tree leaves and like debris by collecting the leaves and like debris into plastic bags. The plastic bags may then be transported to a composting site, or otherwise disposed of. The job of manually collecting leaves and like debris that has been raked into a pile can be tedious and time consuming.

The present invention provides a device and procedure for facilitating the collection of leaves and like debris into plastic bags. The device and procedure according to the present invention are capable of cutting down the tedium and time associated with manual collection of lawn debris into plastic bags, and accomplish these desirable results in a simple and effective manner that does not require motorized equipment.

According to one aspect of the present invention a scoop for leaves or the like is provided. The scoop comprises a first, elongated tubular portion, having first and second ends, and a second scoop-shaped portion. The scoop-shaped portion has a relatively wide generally trapezoid shaped bottom portion with converging side walls, an open top, a first, relatively wide end, and a second, relatively narrow end. The second portion second end is connected to the first portion first end. Means are provided defining a groove adjacent the first portion second end on the exterior of the tubular portion, and handle means extend outwardly from the first portion (preferably from both sides thereof). Clamp means cooperate with the groove for clamping sheet material (preferably a plastic trash bag) between the first portion and the clamp when the sheet material is disposed in the groove.

The first and second portions, groove, and handle means preferably comprise an integral piece of plastic material, such as ABS plastic. The handle means preferably comprise a pair of generally quadrate hollow elements extending outwardly from opposite sides of the first portion between the first and second ends thereof and generally parallel to the bottom of the second portion. The clamp preferably comprises a split ring having an inside diameter approximately the same as the outside diameter of the tubular first portion at the groove, with a connecting bar and tongue latch on opposite sides of a split in the ring. Such a clamp is preferably one commonly known as a "campaniform ring". A gasket of friction material, such as a ring of rubber, is preferably disposed in the groove for cooperation with the sheet material. The scoop is dimensioned for easiest use with the first end of the second portion having a width of about 2-3 feet, and the handles preferably have dimensions of about 4×6 inches.

The invention also comprises a device for readily collecting and disposing of leaves and like lawn debris comprising a scoop as earlier described in combination with a plastic bag having an open mouth portion. The clamp means cooperates with the groove for releasably clamping the bag, at the open mouth, between the first portion and the clamp when the bag is disposed over the groove, the bag open mouth receiving the first tubular portion second end therein.

The invention also comprises a method of collecting leaves and like lawn debris from a grassy area. The method comprises the steps of (a) raking the leaves and like debris into a pile; (b) attaching a plastic bag to the tubular end of the scoop; (c) grasping the handles of the scoop, and moving the scoop into the pile of leaves and like debris to force the debris through the tubular portion of the scoop into the plastic bag; (d) once the plastic bag is filled, removing it from connection to the tubular end, and replacing it with another bag; and (e) repeating steps (c) and (d) until the debris has been removed from the grassy area. Step (c) can also be practiced by grasping the scoop by one handle and pushing the leaves or lawn debris by hand, or with a rake or like implement, in the opposite direction of scoop movement, the debris funneling into the tubular end thereof.

It is a primary object of the present invention to facilitate simple, effective, and relatively quick collection of leaves and like lawn debris that have been raked into a pile. This and other objects of the invention will become clear from an inspection of the detailed description of the invention, and from the appended claims.

DETAILED DESCRIPTION OF THE DRAWINGS

Figure 1:
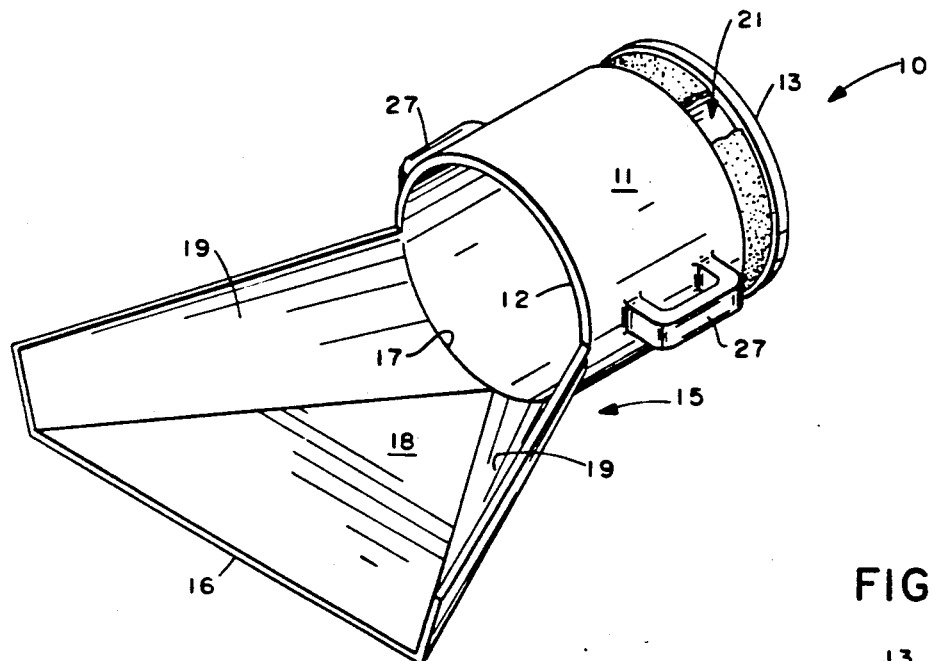
FIG. 1 is a top perspective view of an exemplary lawn scoop according to the present invention.
Figure 2:
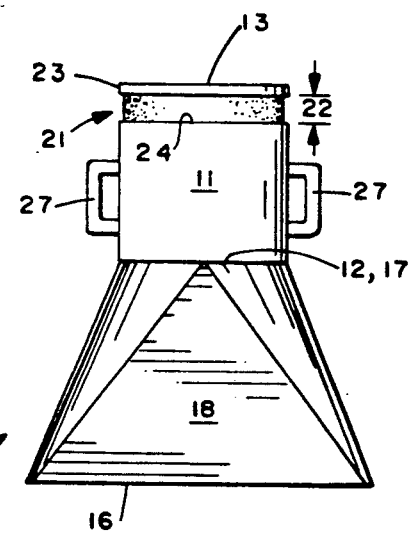
FIG. 2 is a bottom plan view of the scoop of FIG. 1.
Figure 3:
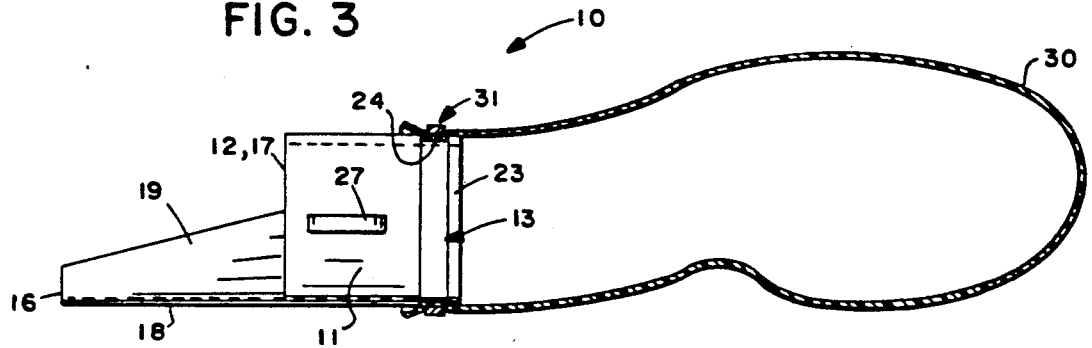
FIG. 3 is a side view of the scoop of FIGS. 1 and 2 shown in operative association with a plastic bag and clamp, both of which are shown in cross section.

An exemplary lawn scoop according to the present invention is shown generally by reference numeral 10 in FIGS. 1 through 3. While the scoop 10 comprises a number of functionally distinct parts, it is desired that they all be formed integrally with each other and preferably formed of a plastic material, such as ABS plastic. Preferably the entire scoop 10 can be injection molded, rotational molded, or otherwise produced in a simple operation, from plastic.

The scoop 10 includes a first elongated tubular portion 11 having a first end 12 and a second end 13. The tubular portion 11 preferably is circular in cross section, and in the exemplary embodiment illustrated in the drawings has a diameter of about 1½ feet. The scoop 10 further comprises a second, scoop-shaped portion, shown generally by reference numeral 15, which has a first, relatively wide, end 16, and a second, relatively narrow, end 17. The bottom portion 18 of the second portion 15 terminates in the end 16, 17 and has generally a trapezoid configuration. Converging side walls 19 upstand from the bottom 18 and also are connected to the first end 12 of the first portion 11.

Adjacent second end 13 of the tubular portion 11, formed in the exterior surface thereof, is means defining a groove 21. In the embodiment illustrated in the drawings, the groove 21 may have a dimension 22 along the dimension of elongation of the tubular portion 11 of about 3 inches, with approximately a one inch wide ring 23 being provided at the second end 13 of the tubular portion 11 (see FIG. 2). A groove preferably has a rubber gasket, 24, or like friction material disposed therein to prevent the plastic bag which is disposed in association with the groove 21 from slipping.

The scoop 10 also preferably comprises handle means, such as the pair of handles 27, extending generally radially outwardly from the first tubular portion 11. As illustrated in the drawings, the handles 27 preferably are a pair of generally quadrate (e.g. rectangular) hollow elements extending from the opposite sides of the tubular portion 11, between the first and second ends 12, 13 thereof and generally parallel to the bottom 18 of the second scoop-shaped portion 15.

While the dimensions of the scoop 10 according to the invention may vary depending upon particular requirement of use, desired costs, etc., particularly desirable dimensions for utilitarian purposes are as follows: The width of the first end 16 of the bottom 18 is about 2-3 feet, preferably about 3 feet. The length of the bottom portion 18 from the end 16 to the end 17 thereof is about 2 feet, with the total length of the scoop 10 from the end 16 to the end 13 of about 3½ feet. As previously mentioned, the diameter, of the tubular portion 11 is preferably about 1½ feet, and the handle 27 preferably extends outwardly from the tube 11 about 4 inches and has a length (in the dimension of elongation of the tube 11) of about 6 inches.

The lawn scoop 10 illustrated in FIGS. 1 and 2 is shown in conjunction with a conventional plastic trash bag 30 in FIG. 3, the combination of the trash bag 30, scoop 10, and clamp means 31 (FIGS. 3 through 5) providing a device for readily collecting and disposing of leaves and like lawn debris.

As illustrated in FIG. 3, the open mouth of a conventional plastic trash bag 30 is disposed in a position so that it surrounds the end 13 of the tubular portion 11, receiving the end 13 therein, with the trash bag overlying the groove 21 and in contact with the gasket 24. Any suitable clamp means 31, which even may be as simple as an elastic band normally having a diameter smaller than the diameter of the groove 21, is disposed over the groove 21, and clamps the bag 30 in place on the tubular portion 11.

Figure 4:
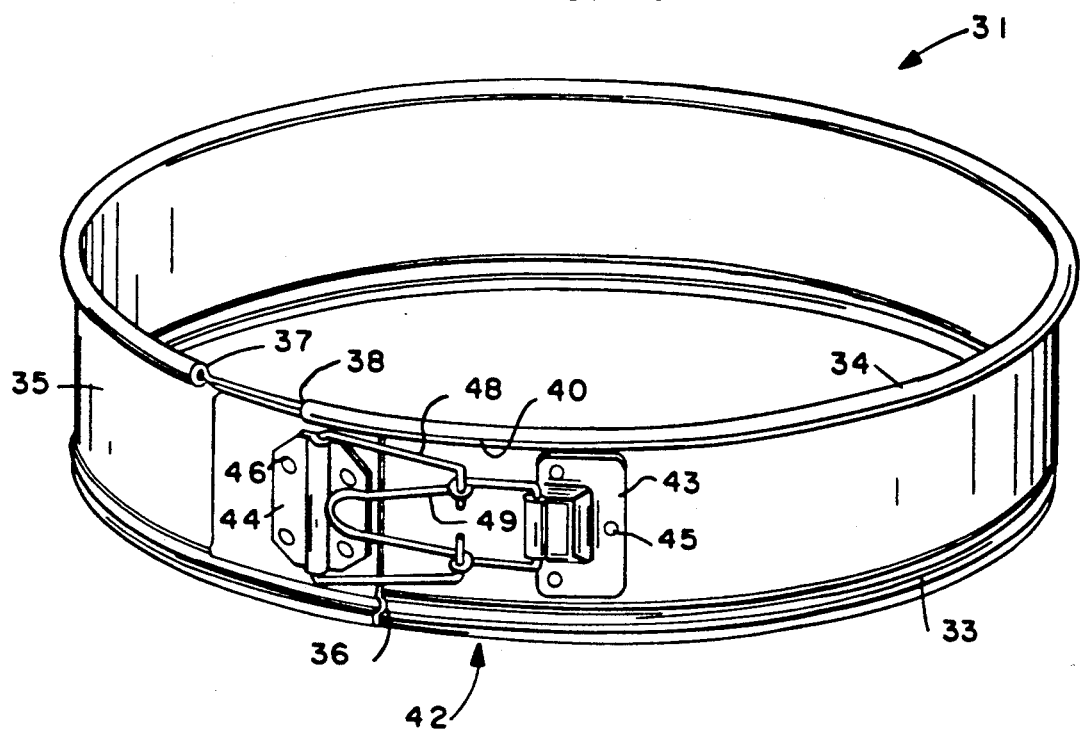
FIGS. 4 and 5 perspective views of an exemplary clamp utilizable with the scoop of FIGS. 1 through 3, shown in non-clamping and clamping positions, respectively.
Figure 5:
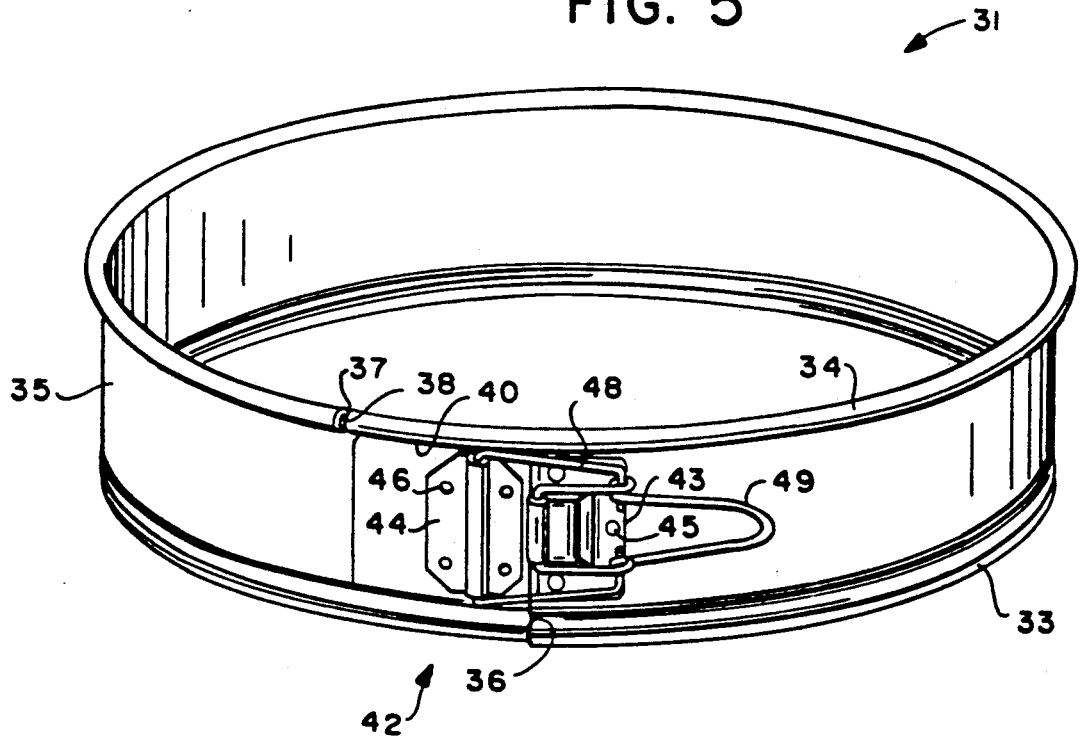

While the clamp 31 may take a form as simple as an elastic band, a particularly desirable form which provides for positive clamping of the bag 30 in place is illustrated in FIGS. 4 and 5 and referenced generally by reference numeral 31. The structure illustrated in FIGS. 4 and 5 is commonly known as a split ring clamp, or a "campaniform ring".

The "campaniform ring" 31 has an inside rim 33, an outside rim 34, with bridging material 35 therebetween, and is split as illustrated at splits 36, 37, and 38 in the elements 33 through 35 respectively (see FIG. 4). A sliding groove is provided between the ends 39, 40 defining split 36 in the inner rim 33, being beveled as illustrated in FIG. 4. To hold the portions on either sides of the splits 36 through 38 in place is a latch system 42. Latch system 42 includes end brackets 43, 44 which are connected by rivets 45, 46 to the intermediate portion 37 of the "campaniform ring" 31, with a connecting bar 48 which spans the brackets 44, 43, and is held in place in the latched position by the tongue latch 49.

In the utilization of the device according to the invention in a method of collecting leaves and like lawn debris from a grassy area, the user first rakes the leaves and like debris into a pile. Then the plastic bag 30 is attached to the scoop 10 by moving the open mouth of the bag 30 over the groove 21, splitting the "campaniform ring" 31 at the splits 36 through 38 and moving ring 31 into a position so that it surrounds the groove 21; allowing the ring 31 to relax so that it presses the bag 30 into the groove 21, and into contact with the rubber gasket 24; and then moving the latch tongue 49 and connecting bar 48 to latch the ring 31 in place with the splits 36 through 38 closed up (FIG. 5). Then the user grasps the handles 27 and moves the scoop 10 into the pile of leaves and like debris, forcing the debris over the scoop bottom 18, and into the tubular portion 11 and subsequently into the plastic bag 30. While a most effective use is by moving the scoop with two hands, grasping both handles 27, the device is versatile and one handle can be grasped while the leaves or like debris are pushed up with the user's hand over the bottom 18 into the tubular portion 11, or utilizing a rake or like implement.

Once the plastic bag 30 is filled, it is removed from connection to the tubular end merely by unlatching the latch 48, 49 and pulling the open mouth of the bag from contact with the tubular end 11. Then the bag 30 is replaced with another bag, and the steps are repeated until all the debris desired has been removed from the grassy area.

It will thus be seen that according to the present invention a simple yet effective manual implement has been provided which greatly facilitates the collection of tree leaves and like lawn debris from a grassy area.

While the invention has been herein shown and described in what is presently conceived to be the most practical and preferred embodiment thereof, it will be apparent to those of ordinary skill in the art that many modifications may be made thereof, within the scope of the invention, which scope is to be accorded the broadest interpretation of the appended claims so as to encompass all equivalent devices and methods.

What is claimed is:

1. A scoop for leaves or the like comprising:
   a first, elongated tubular portion, having a first end and a second end and a diameter of approximately one and one-half feet;
   a second scoop-shaped portion having a relatively wide generally polygonal shaped bottom portion with converging side walls, an open top, a first, relatively wide end, and a second, relatively narrow end;
   said second portion second end connected to said first portion first end;
   means defining a groove adjacent said first portion second end on the exterior of said tubular portion;
   handle means extending outwardly from said first portion; and
   clamp means cooperating with said groove for clamping sheet material between said first portion and said clamp when the sheet material is disposed in said groove.

2. A scoop as recited in claim 1, wherein said first portion, second portion, groove, and handle means comprise an integral piece of plastic material.

3. A scoop as recited in claim 2 wherein the plastic material is ABS.

4. A scoop as recited in claim 3 wherein said handle means comprise a pair of generally quadrate hollow elements extending outwardly from opposite sides of said first portion between the first and second ends thereof, and generally parallel to said bottom of said second portion.

5. A scoop as recited in claim 4 wherein said clamp means comprises a split ring having an inside diameter approximately the same as the outside diameter of said tubular first portion at said groove, with a connecting bar and tongue latch on opposite sides of a split in said ring for cooperating to hold the opposite sides of the split together.

6. A scoop as recited in claim 5 further comprising a gasket of friction material disposed in said groove for cooperating with sheet material disposed therein.

7. A scoop as recited in claim 6 wherein said wide end of said second portion has a width of about 2-3 feet.

8. A scoop as recited in claim 7 wherein each of said handles have dimensions of about 4 inches by 6 inches.

9. A scoop as recited in claim 1 wherein said handle means comprise a pair of generally quadrate hollow elements extending outwardly from opposite sides of said first portion between the first and second ends thereof, and generally parallel to said bottom of said second portion.

10. A scoop as recited in claim 1 further comprising a gasket of friction material disposed in said groove for cooperating with sheet material disposed therein.

11. A scoop as recited in claim 1 wherein said wide end of said second portion has a width of about 2-3 feet.

12. A scoop as recited in claim 1 wherein said clamp means comprises a split ring having an inside diameter approximately the same as the outside diameter of said tubular first portion at said groove, with a connecting bar and tongue latch on opposite sides of a split in said ring for cooperating to hold the opposite sides of the split together.

13. A device for readily collecting and disposing of leaves and like lawn debris, comprising:
 a plastic bag having an open mouth portion;
 a scoop, said scoop comprising: a first, elongated tubular portion, having a first end and a second end; a second scoop-shaped portion having a relatively wide generally polygonal shaped bottom portion with converging side walls, an open top, a first, relatively wide end, and a second, relatively narrow end; said second portion second end connected to said first portion first end; and means defining a groove adjacent said first portion second end on the exterior of said tubular portion; and
 clamp means cooperating with said groove for releasably clamping said bag, at said open mouth, between said first portion and said clamp when said bag is disposed over said groove, said bag open mouth receiving said first tubular portion second end thereof.

14. A device as recited in claim 13 further comprising handle means connected to said first portion between said first and second ends thereof for grasping by a user.

15. A device as recited in claim 13 wherein said first portion, second portion, groove, and handle means comprise an integral piece of plastic material.

16. A device as recited in claim 15 wherein the plastic material is ABS.

17. A device as recited in claim 13 wherein said clamp means comprises a split ring having an inside diameter approximately the same as the outside diameter of said tubular first portion at said groove, with a connecting bar and tongue latch on opposite sides of a split in said ring for cooperating to hold the opposite sides of the split together.

18. A device as recited in claim 17 further comprising a gasket of friction material disposed in said groove for cooperating with sheet material disposed therein.

19. A device as recited in claim 13 said wide end of said second portion has a width of about 2-3 feet.

* * * * *